United States Patent [19]
Fujiwara et al.

[11] Patent Number: 5,408,841
[45] Date of Patent: Apr. 25, 1995

[54] AUTOMOTIVE AIR CONDITIONER

[75] Inventors: Takashi Fujiwara, Okazaki; Kiyoshi Usami, Oobu; Yasuyuki Nishi, Kariya; Shigeo Numazawa, Nagoya; Hiroshi Kishita, Kariya, all of Japan

[73] Assignee: Nippondenso Co., Ltd., Kariya, Japan

[21] Appl. No.: 208,085

[22] Filed: Mar. 9, 1994

Related U.S. Application Data

[63] Continuation of Ser. No. 800,912, Dec. 5, 1991, abandoned.

[30] Foreign Application Priority Data

Dec. 6, 1990 [JP] Japan ................... 2-400696
Jul. 19, 1991 [JP] Japan ................... 3-179868

[51] Int. Cl.$^6$ ............................. F25B 41/00
[52] U.S. Cl. ........................ 62/192; 62/197; 62/231
[58] Field of Search ............ 62/192, 197, 231, 84, 62/473, 117

[56] References Cited

U.S. PATENT DOCUMENTS

| | | | |
|---|---|---|---|
| 2,134,724 | 11/1938 | McClanahan | 165/43 |
| 3,014,352 | 12/1961 | Leimbach et al. | 62/197 |
| 3,494,146 | 2/1970 | Valbjorn | 62/473 |
| 3,626,715 | 12/1971 | Bottum | 62/217 X |
| 4,930,320 | 6/1990 | Ide et al. | 62/228.5 X |

FOREIGN PATENT DOCUMENTS 0089960  3/1990  Japan ................... 62/197

Primary Examiner—William E. Wayner
Attorney, Agent, or Firm—Cushman, Darby & Cushman

[57] ABSTRACT

A compressor is prevented from the problem of seizure at start-up even when return of lubricant to the compressor is delayed. In such a refrigerant cycle, a bypass passage bypasses an expansion member and an evaporator. The bypass passage opens for a predetermined time when the compressor starts. The predetermined time is dependent upon external temperature, the compressor speed, compressor capacity, etc.

23 Claims, 20 Drawing Sheets

AUTOMOTIVE AIR CONDITIONER

This is a continuation of U.S. Application No. 07/800,912, filed on Dec. 5, 1991, which was abandoned.

BACKGROUND OF THE INVENTION

This invention relates to an automotive air conditioner, more particularly, it relates to an automotive air conditioner for preventing compressor lock caused by a lack of lubricant.

As for an automotive air conditioner, lubricant for lubricating portions of a compressor which rotate, slide, etc., is sucked into a refrigerant cycle with refrigerant. More particularly, when an automotive air conditioner is assembled, a prescribed amount of lubricant is enclosed in the compressor, and the compressor is connected to each element, e.g., a condenser, expansion means, evaporator, etc., with a refrigerant pipe. Then in such a condition, a prescribed amount of refrigerant is enclosed into a refrigerant cycle. Consequently, in such a condition that a refrigerant is enclosed in the refrigerant cycle, lubricant and refrigerant are mixed in the compressor.

Since a lubricant which is compatible with the refrigerant is required, the refrigerant in the compressor is discharged when the compressor starts up and concurrently the lubricant inside the compressor is also discharged into the refrigerant cycle. Consequently, most of the lubricant inside the compressor is discharged into the refrigerant cycle when the compressor starts up and while the lubricant circulates through the refrigerant cycle and it is sucked by the compressor again, the compressor rotates almost without lubricant. Therefore, lubrication becomes insufficient at the portions which rotate or slide and that causes a problem of seizure, etc.

SUMMARY OF THE INVENTION

This invention was made in consideration of the above point, and its object is to solve poor lubrication of the compressor when the compressor starts up.

It is another object of the present invention to continue a smooth drive by encouraging lubricant to return when there is a fear of causing poor lubrication of the compressor due to a reduction of the amount of the lubricant returning to the compressor in both a condition where the compressor starts up and also in a condition where the air conditioner is operated continuously.

To achieve these objects, the present inventors return the lubricant to the compressor as quickly as possible. The lubricant returned to the compressor is the same as the lubricant mixed with the refrigerant that was discharged to the refrigerant cycle.

By analyzing the refrigerant cycle from this point of view, it was experimentally understood that the lubricant discharged from the compressor passed through the inside of the condenser in a relatively early stage. The reason is that a condenser has a large capacity, however, since the refrigerant is kept at a high temperature and a high pressure, the lubricant passes through the condenser because of the high pressure of the refrigerant without stagnating and stopping in the condenser.

It was experimentally understood that the lubricant stagnates or stops in the immediate area upstream and downstream of an expansion means. This is believed to occur because the expansion means narrows a refrigerant passage to decompress and expand the lubricant. The lubricant thus stagnates or stops at the narrowed portion.

Further, it was experimentally understood that the lubricant tends to stagnate or stop at the inside of an evaporator after passing through the expansion means. That reason is thought as follows: the evaporator has as large a capacity as the condenser. Lubricant is easily separated from the refrigerant because the refrigerant is at a low pressure and low temperature in the evaporator and the force to discharge the lubricant from the evaporator is relatively small because of the low pressure of the refrigerant.

Based on the above experimental results by the inventors, the present invention adopts and includes a bypass passage bypassing the expansion means, and thus removing the evaporator from the refrigeration cycle, and a bypass valve for controlling opening and shutting of the bypass passage. Since the bypass valve opens for a predetermined time when the compressor starts up, the lubricant can return to the compressor in its early stage by bypassing the expansion means and the evaporator.

The timing of opening and closing of the bypass passage is controlled by factors such as the temperature of the outside air, the refrigerant pressure (which varies depending upon the temperature of the outside air) and the number of the revolutions of the compressor.

Further, opening the bypass passage has no influence on an air cooling capacity of an air conditioner. Rather, noise arises by opening the bypass passage and this noise has relation to a pressure of a high pressure side of the air conditioner, thus, the bypass passage opens only the minimum time required to lube the compressor.

Consequently, in an automotive air conditioner of the present invention, lubricant discharged with refrigerant returns to the compressor in its early stages without stopping or stagnating at the expansion means and the evaporator, even when the compressor starts up. Therefore, even if all lubricant is discharged from the compressor with the refrigerant, it is a short time for the compressor to run without the lubricant. In other words, before seizure, etc., is caused, the lubricant returns to the compressor and the revolution of the compressor becomes smooth.

Further, since the lubricant and the refrigerant bypass the expansion means and the evaporator only for a predetermined time when the compressor starts up, etc., there is no bad influence on the air conditioning capacity. When the bypass passage, however, is opened, noise arises when the refrigerant passes through the bypass passage. In the present invention, the bypass passage can be shut before noise becomes uncomfortable.

And further, in the automotive air conditioner of the present invention, when the amount of the lubricant returning to the compressor is small at the time when not only the compressor starts up but also when the compressor runs regularly, the lubricant certainly can return to the compressor by opening the bypass passage. Therefore, the automotive air conditioner of the present invention improves its durability.

DETAILED DESCRIPTION OF THE INVENTION

Figure 1:
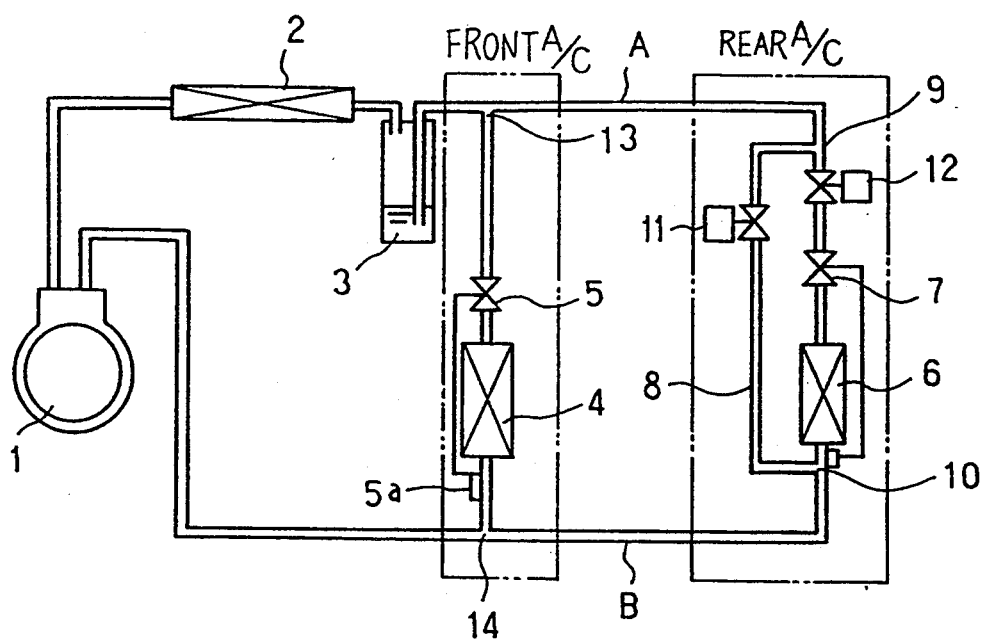
FIG. 1 is a diagram showing an example of a refrigerant cycle of an automotive air conditioner of the present invention.

Embodiments of the present invention are explained below. FIG. 1 shows a schematic refrigerant cycle of an automotive air conditioner of the present invention. This embodiment shows an example of two evaporators 4 and 6 disposed at the front and the rear of an automobile. The numeral 1 is a compressor. The compressor 1 sucks, compresses and discharges the refrigerant by receiving a driving force through belt and magnetic clutch (both not shown). The refrigerant in a high pressure and high temperature condition is discharged from the compressor, which is condensed into liquid in the condenser 2. Condensed refrigerant is accumulated in the receiver 3 and only liquid refrigerant is led to the evaporators 4 and 6 due to the separation of gas and liquid in the receiver 3.

The misty refrigerant at a low pressure and low temperature is supplied to the front evaporator 4, which is decompressed and expanded through a front expansion means. In this embodiment, an expansion valve having a temperature sensing tube 5a is used as a front expansion means 5. However, an expansion valve varying throttle volume by feeding back the refrigerant temperature at the outlet side of the front evaporator 4 may be used. Instead of the expansion valve, a fixed throttle valve, for example, a capillary tube can be used. Further, an electric expansion valve controlling its opening based on an electric signal, etc., can be used. On the other hand, the misty refrigerant at a low temperature and at a low pressure is supplied to the rear evaporator 6 through a rear expansion means 7. This rear expansion means 7 is also an expansion valve which varies throttle volume by feedback based on the temperature of the refrigerant having passed through the rear evaporator 6. A bypass passage 8 is disposed to bypass the rear expansion means 7 and the rear evaporator 6. One end 9 of the bypass passage 8 is separated from the refrigerant pipe at the upstream side of the rear expansion means 7 and the other end 10 of the bypass passage 8 is joined to the refrigerant pipe downstream of the rear evaporator 6. A bypass valve 11 is disposed midway in the bypass passage 8 and by opening and closing the bypass valve 11, the bypass passage 8 is also switched from an open state to a closed state, or vice-versa. In this embodiment, a switch valve 12 opening and closing the refrigerant passage is disposed downstream of one end 9 of the bypass passage 8 and upstream of the rear expansion means 7. This switch valve 12 and the bypass valve 11 are both electric magnetic valves and they switch the passage between the open and the closed states preferably based on an electric signal from a control means stated below.

Figure 2:
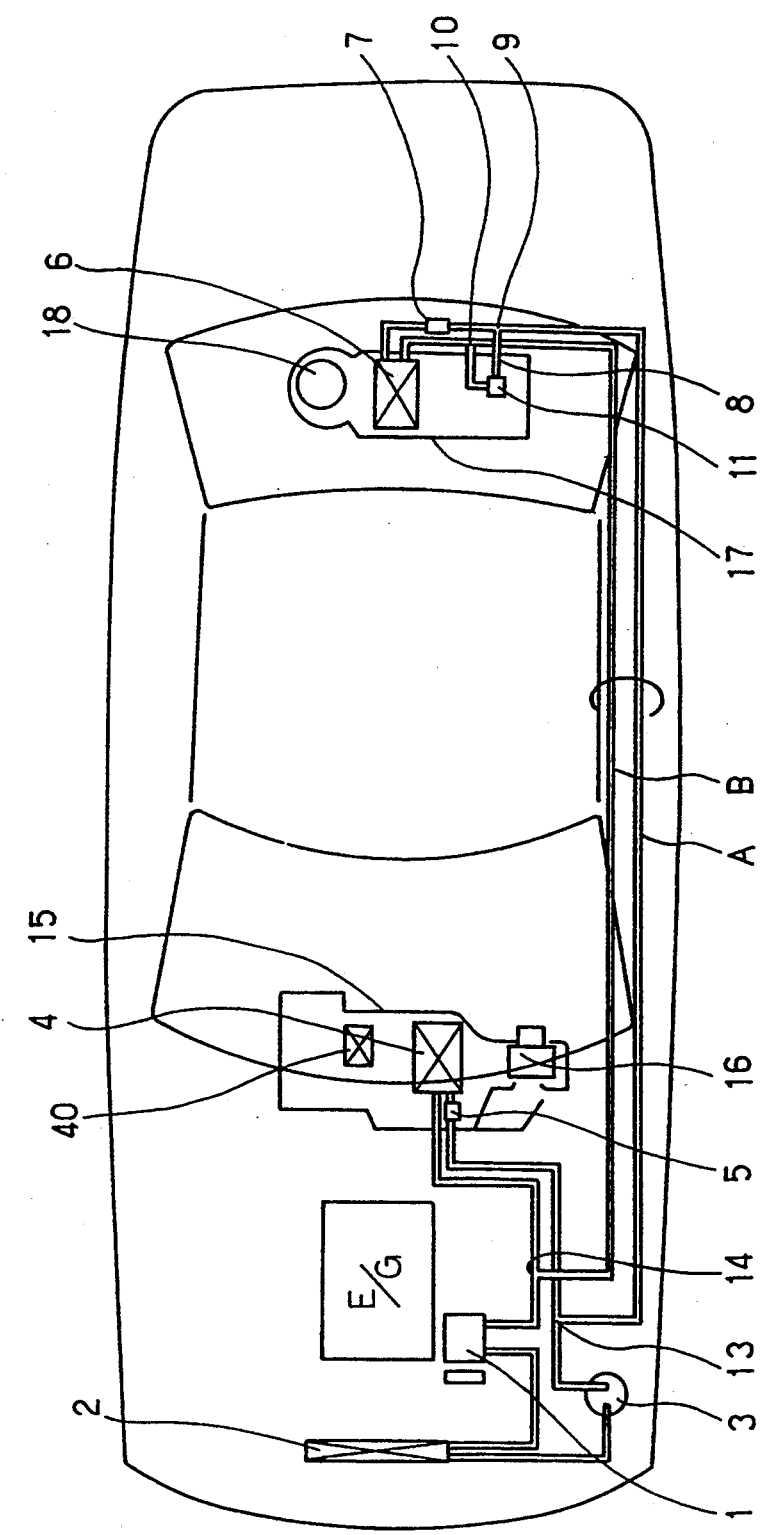
FIG. 2 is a structural diagram showing an installed condition of the refrigerant apparatus of FIG. 1 in an automobile.

FIG. 2 is a schematic diagram showing the refrigerant cycle of FIG. 1 installed in an automobile. The compressor 1 is disposed at the side of the engine, and the condenser 2 is disposed at the front side of an automobile to receive a cooling wind easily. The refrigerant pipe branches off at a turning point 13 downstream of the receiver 3 and leads to the front evaporator 4 and the rear evaporator 6. The front evaporator 4 is disposed in a cooling case 15 arranged at a front side of a compartment. In the cooling case 15, there are a blower 16 and an outlet. The blower 16 blows air that is selectively supplied from inside of the compartment or outside of the compartment to the front evaporator 4. The outlet blows air, the temperature of which is adjusted by the heater core 40 after the air becomes cooled air by passing through the front evaporator 4.

The rear evaporator 6 is disposed in a rear cooling case 17 arranged below a rear shelf of the automobile. A blower 18 blowing air for air conditioning to the rear evaporator 6 is disposed in the rear cooling case 17. The refrigerant passing through the rear evaporator 6 and the front evaporator 4 join at a junction 14 and is sucked into the compressor 1.

Figure 3:
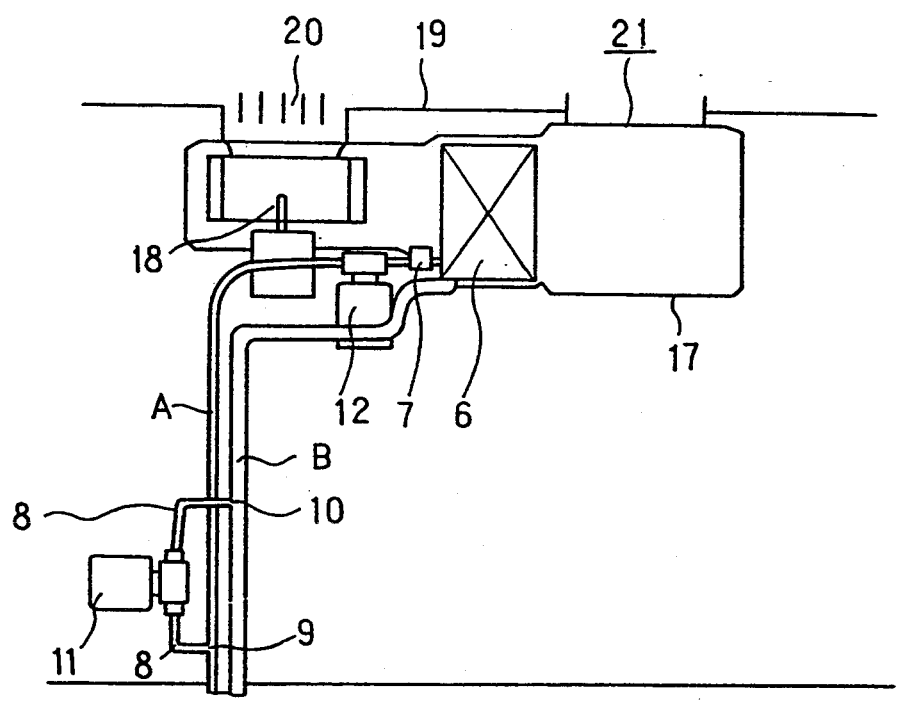
FIG. 3 is a structural diagram showing an arrangement of the rear cooler shown in FIG. 2.

A condition of the bypass passage 8 in the rear side is explained in FIG. 3. As stated above, the rear cooling case 17 is disposed below a rear shelf 19 and in the trunk of the automobile. The air in the compartment sucked through the air inlet 20 is supplied to the rear evaporator 6 by the blower 18. After passing through the rear evaporator 6, the air is supplied to the inside of the compartment through the outlet 21. An air purifier or an air filter, etc., is disposed as the need arises downstream of the evaporator 6 in the rear cooling case 17. The switch valve 12 and the bypass valve 11 stated above are both electric magnetic valves and both are disposed at the side of the trunk.

A refrigerant pipe A for high pressure and a refrigerant pipe B for low pressure are both led from under the floor of the trunk to the engine room at the front end of the automobile through the side of the automobile. At least the switch valve 12, the bypass valve 11 and the bypass passage 8 are disposed at a place so as not to occupy trunk space and at a place where the sound of opening and closing of the electric magnetic valves 11 and 12 will not be transmitted to the compartment of the automobile.

In this embodiment, the bypass passage 8, the bypass valve 11 and the switch valve 12 are disposed in the trunk, which is the most effective position to save space and to insulate the compartment from noise of opening and closing of an electric magnetic valve. The electric magnetic valve, normally in a closed state, is used as the bypass valve 11 as stated above, and it opens the bypass passage 8 only when bypass is required by an impressed voltage. In this embodiment, the bypass valve 11 is disposed at the side of the trunk. However, it may be disposed at the rear cooling case 17 in such a manner to be incorporated as the need arises. Further, the bypass valve 11 may be disposed under the floor of the trunk.

In this embodiment, the compressor 1 is a variable capacity type compressor of which capacity is continuously variable based on an electric signal.

Figure 4:
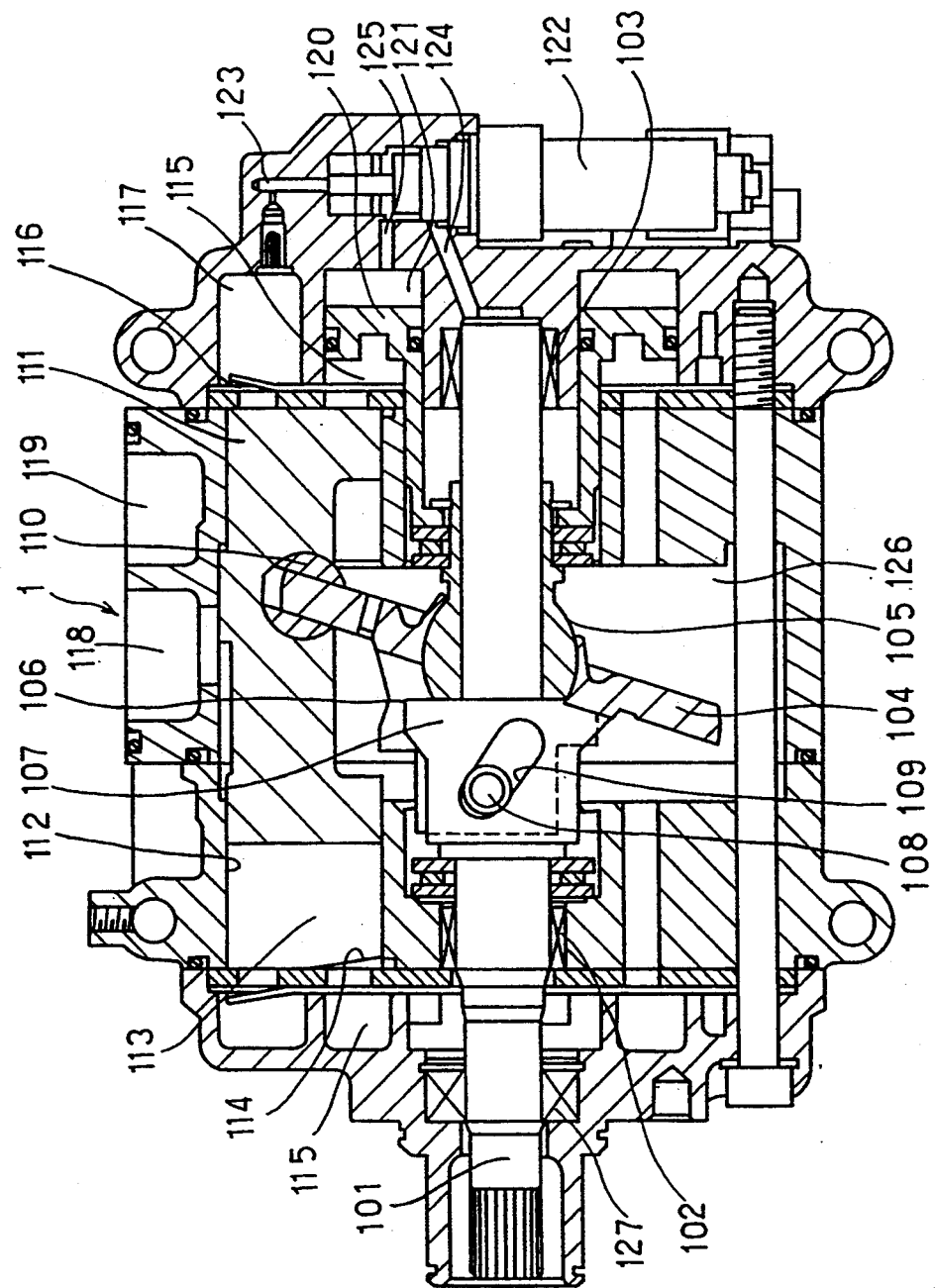
FIG. 4 is a cross-sectional view of the compressor shown in FIG. 1.
Figure 5:
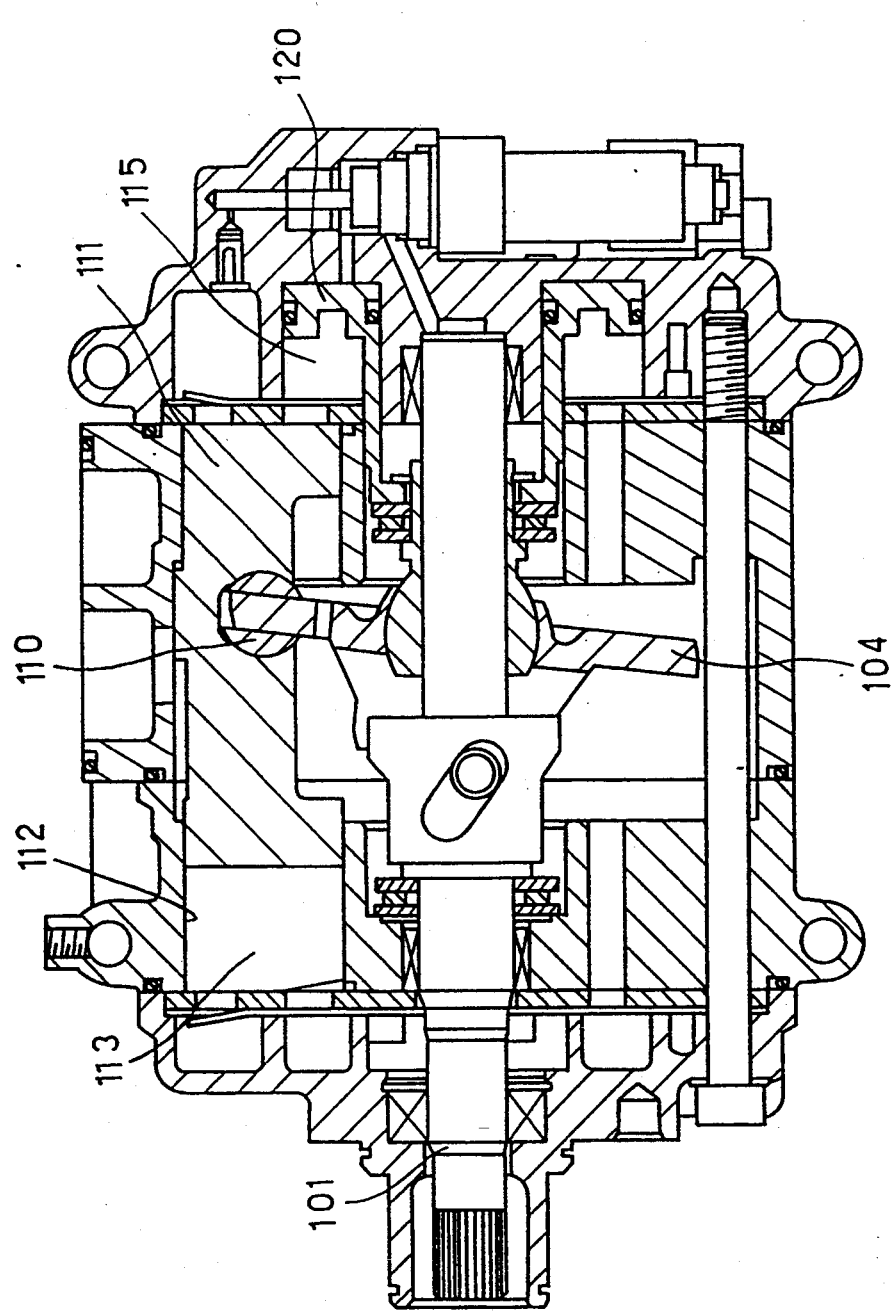
FIG. 5 is a cross-sectional view of the compressor shown in FIG. 1.

The structure of the compressor 1 is depicted in FIGS. 4 and 5. The numeral 101 is a shaft which rotates by receiving driving power from an engine. This shaft 101 is rotatably supported by a housing through bearings 102 and 103. A skew plate 104 is installed on the shaft 101 in such a manner to be able to vary the angle of inclination of the skew plate 104. The center of the revolution of the skew plate 104 is rotatable at a spherical supporting portion 105 and the revolution of the shaft 101 is transmitted to the skew plate 104 by setting the width across flat portion 107 of the shaft 101 into groove 106 formed in the skew plate 104. The skew plate 104 is fixed by a pin 108 through the groove 106 and the angle of inclination of the skew plate 104 is varied by moving the pin 108 along an oblong window 109 formed in the flat portion 107.

The skew plate 104 is connected to a piston 111 through a shoe 110, and the piston 111 reciprocates in a cylinder 112 by receiving the skew plate's swing motion. During the reciprocation of the piston 111, at the suction process in which the capacity of an operation chamber 113 expands, the refrigerant is sucked into the operation chamber 113 from the suction chamber 115 when a suction valve 114 is open. In contrast, during the compression process in which the capacity of the operation chamber 113 decreases in relation to the movement of the piston 111, the refrigerant is discharged to a discharge chamber 117 through a discharge valve 116. The suction chamber 115 is connected to a suction inlet 118 through a suction passage in the compressor and the refrigerant sucked from the evaporator at low temperature and low pressure is supplied thereto. The discharge chamber 117 is connected to a discharge outlet 119 through a discharge passage in the compressor and the refrigerant is discharged to the condenser 2 through the discharge outlet 119.

The discharging capacity of the compressor 1 is continuously varied because the amount of the stroke of the piston 111 is variably controlled. The amount of the stroke of the piston 111 is varied pursuant to the angle of inclination of the skew plate 104. Varying the angle of inclination of the skew plate 104 is performed by varying the revolution center position and the angle of inclination of the skew plate 104, together with the condition that the position of top dead center shown in the right side of FIG. 4 is always kept in the constant place. In this embodiment, the above stated control is performed by sliding a spherical supporting portion 105 right and left in the drawing along the shaft 101 with a spur 120. The displacement of the position of the spur 120 is achieved by adjusting pressure in a pressure control chamber 121 accommodated behind the spur 120. One side of the spur 120 is a suction chamber and suction pressure is always impressed. Pressure adjusted by the control valve 122 is supplied to the pressure control chamber 121 and the differential pressure between the pressure control chamber 121 and the suction chamber 115 is impressed to the spur 120. Consequently, the angle of inclination of the skew plate 104 is positioned at the place to balance the pressure impressed to the spur 120 with a compression reaction force by the piston 111. The control valve 122 adjusts the discharge pressure supplied through a high pressure leading passage 123 and a low pressure supplied from a low pressure leading passage 124, and controlled constant pressure is supplied to the pressure control chamber 121 through a controlled pressure passage 125.

FIG. 4 shows the condition that the spur 120 is moved to the left in a determined distance by impressing a determined pressure to the pressure control chamber 121. FIG. 5 shows the condition of the discharging capacity being reduced to less than the condition in FIG. 4. A suction pressure is provided to the pressure control chamber 121 in this situation. Consequently, the spur 120 moves maximally to the right in the drawing pursuant to the compression reaction force, etc. Further, the revolution center position of the skew plate 104 also moves to the right in the drawing and the angle of inclination of the skew plate 104 becomes almost a right angle relative to shaft 101.

As FIG. 5 shows clearly, in this condition the swing amount of the skew plate 104 is small so that an amount of the stroke of the piston 111 is minimized. A sensor magnetically detecting the amount of stroke of the piston 111 is installed in the compressor, however, the sensor is not shown in the drawing.

This compressor is manufactured with lubricant enclosed in a skew plate chamber 126. Under the condition that refrigerant pipe is connected to the compressor 1 as shown in FIG. 2, the refrigerant is enclosed in the refrigerant cycle from service valves disposed near the discharging outlet 119 of the compressor and the suction inlet 118 of the compressor.

The lubricant dissolves in the refrigerant in the skew plate chamber 126 when compressor 1 is initially started after manufacture or after the compressor has been stopped for a long time period.

It is known that almost all of the amount of the lubricant in the skew plate chamber 126 is discharged to the refrigerant cycle through the discharging outlet 119 with the refrigerant. The lubricant once discharged takes almost one minute to return to the compressor 1 when it is at a low temperature, but it depends on the condition of the expansion means 5 and 7, and the evaporators 4 and 6. Especially when the compressor 1 is driven with its minimum capacity as shown in FIG. 5, it takes almost two minutes to return the lubricant because the circulating amount of the refrigerant in the refrigerant cycle is small. In this case, there is less lubricant between the shoe 110 and the piston 111, the piston 111 and the cylinder 112, the pin 108 and the long ditch 109, and each bearing 102 and 103, a shaft seal device 127, etc., so that is apt to cause inferior sliding. Since a large compression reaction force is impressed, especially between the shoe 110 and the piston 111, the inferior lubrication is apt to cause seizure at this point.

Figure 6:
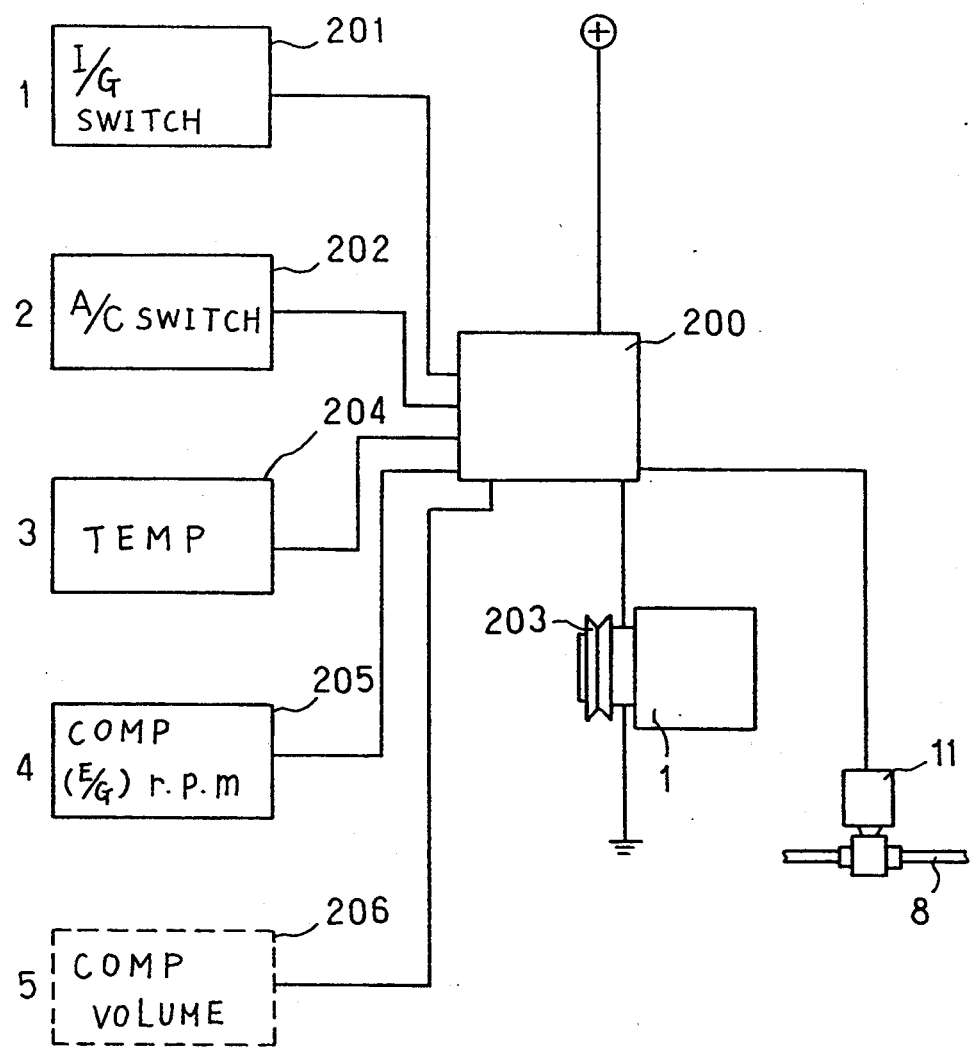
FIG. 6 is a structural diagram showing a control means of the air conditioner shown in FIG. 1.

As shown in FIG. 6, this air conditioner utilizes a control means 200 for controlling the opening and closing of the bypass valve 11 by detecting the start of the compressor 1. The control means 200 utilizes an ignition key switch signal 201 and an air conditioning switch signal 202 as a starting signal of the compressor 1. The ignition key switch signal 201 shows an engine starting. The air conditioning switch signal 202 shows a connection of an electric magnetic clutch 203. As stated below, since a circulating time for the lubricant at the starting varies depending on the temperature of the outside air, the revolutions of the compressor and the capacity of the compressor, a signal representing the temperature of the outside air 204, a signal representing the revolutions of the compressor 205 and a signal representing the capacity of the compressor 206 are input to the control means 200 for compensation. The ignition key switch signal 201, the air conditioning switch signal 202, the outside air temperature signal 204, the compressor revolution signal 205 and the compressor capacity signal 206 are utilized as not only signals for controlling switching of the bypass passage 8 but also signals for controlling the temperature of the conditioned air supplied to the automobile. In this embodiment a case is shown that the control means 200 is utilized only for opening and closing the bypass passage 8. However, there is no doubt that the control means 200 may be utilized for controlling a normal automotive air conditioner. To be specific, it may be utilized for controlling the opening angle of an air mixing damper or the revolutions of a blower.

In FIG. 6, the control means 200 opens the bypass valve 11 for a fixed time when it judges that the engine is started based on the ignition key switch signal 201. Further, the compressor 1 is started based on the air conditioning switch signal 202 that shows that the electric magnetic clutch 203 is connected at the same time as the engine is running.

Figure 7:
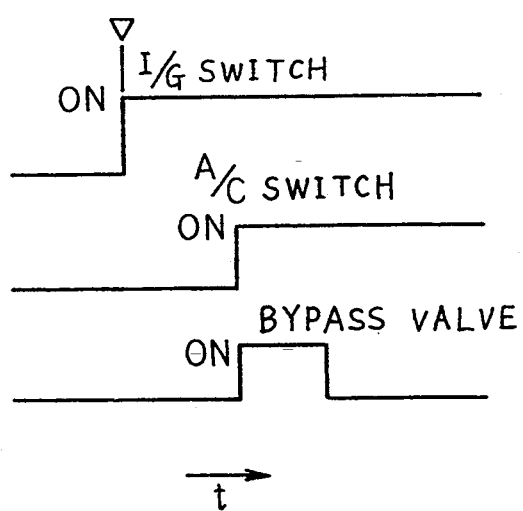
FIG. 7 is a time chart showing an operating condition of the control means shown in FIG. 6.

That is, the control means 200 judges whether the compressor has started only after an engine has been started. In other words, even if a passenger switches on the air conditioning switch for the second time when a car is running, the bypass passage 8 is not open as shown in FIG. 7. This means that the bypass passage 8 is employed to prevent insufficient lubrication at the starting of the compressor 1. The use of the bypass passage 8 is limited to use for lubrication. That is, the condition that all lubricant is discharged from the compressor is caused by the lubricant being dissolved in the refrigerant in the compressor 1 after a long stoppage. Even if the air conditioning switch 202 repeatedly switches on or off when a car is running, there is no liquid refrigerant in the compressor 1 in such a condition. Consequently, there is no need to open the bypass passage 8. On the contrary, if the bypass passage 8 is open, the cooling capacity of the evaporator 6 is reduced. Therefore, from the point of controlling the air conditioner, to open the bypass passage 8 causes a reduction cooling ability.

Figure 8:
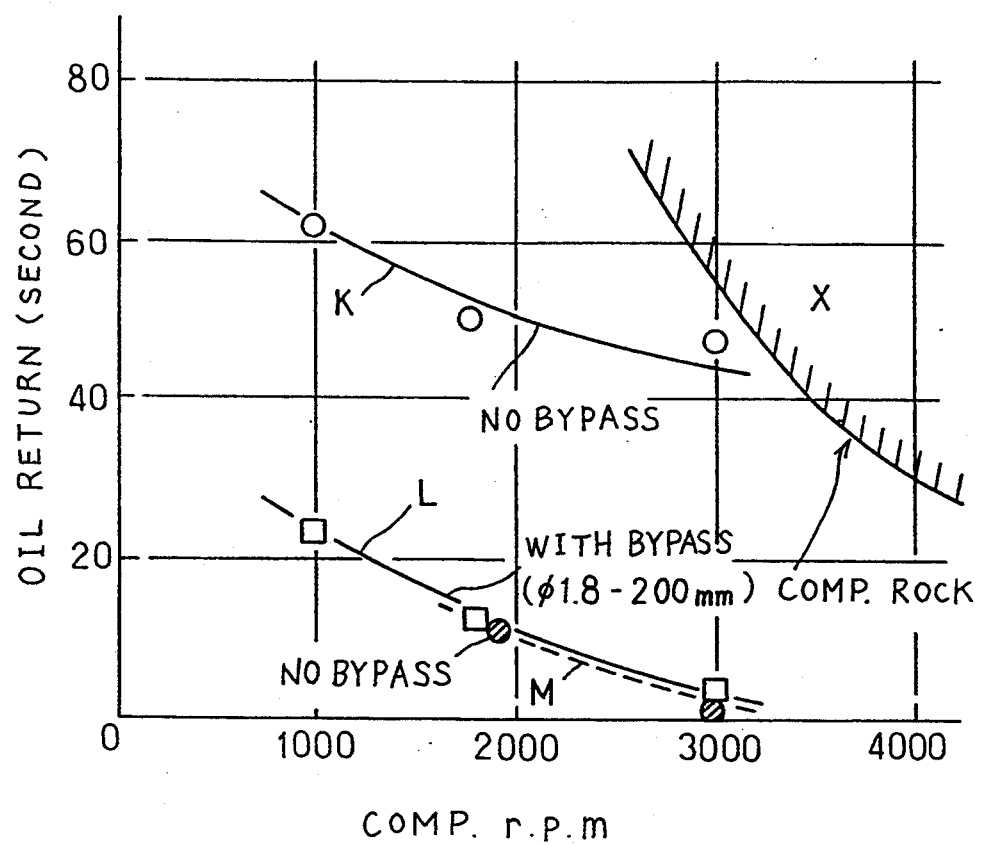
FIG. 8 is a graph showing experimental data of the revolutions of the compressor versus oil return time.

The open-state time of the bypass passage 8 by the control means 200 is explained next. FIG. 8 presents experimental data showing the relation between the revolutions of the compressor and the oil (lubricant) return time. The experiment shown in FIG. 8 used not the refrigerant cycle in FIG. 1, but the refrigerant cycle in FIG. 9. Namely, it used only large front expansion means 5 and the front evaporator 4 without the rear evaporator 6. Consequently, the bypass passage 8 bypasses the front expansion means 5 and the front evaporator 4. In FIG. 8, a solid line K shows the result which was gained under the condition that the refrigerant cycle has no bypass passage and the temperature of the outside air is 0° C. A solid line L shows the result which was gained under the condition that the refrigerant cycle has bypass passage and the temperature of the outside air is 0° C. A dashed line M shows the result which was gained under the condition that the refrigerant cycle has no bypass passage and the temperature of the outside air is 20° C.

FIG. 8 clearly shows that under the condition that the temperature of the outside air is 20° C., the lubricant returns in a comparatively short time, e.g., when the number of revolutions of the compressor is 2000 rpm, it takes 10 seconds, when 3000 rpm, it takes 2 seconds without installing the bypass passage 8. However, in the case that there is no bypass passage 8 and when the temperature of the outside air falls to 0° C., it takes 45 seconds at 3000 rpm of the compressor 1. The area X which is in the upper right side in FIG. 8 is an area which is apt to cause seizure of the compressor 1. The refrigerant cycle having no bypass passage 8 can easily cause seizure of the compressor 1 if the condition of the temperature of the outside air is poor. To the contrary, it was confirmed that even if the temperature of the outside air is 0° C., the refrigerant cycle having the bypass passage 8 of this embodiment lets the lubricant return in about 4 seconds, which is in a very short time, at 3000 rpm of the compressor 1.

This result is far from the area X, which causes seizure of the compressor 1 shown in FIG. 8, and it was confirmed that it is completely effective in preventing seizure of the compressor 1. The bypass passage 8 which was used in the experiment has an approximate inner diameter of 1.8 mm and a length of 200 mm. The oil return time of the lubricant through the bypass passage 8 may be varied by altering the dimensions of the bypass passage. However, since the oil return time is far from area X, it is thought that whatever dimensions a bypass passage adopts, it is fit for practical use. To make a diameter of the bypass passage 8 very small or make a length thereof very long is not desirable in practical use because the bypass passage 8 may become clogged by a foreign body. Further, it is difficult to arrange a long bypass passage in an automobile.

Figure 9:
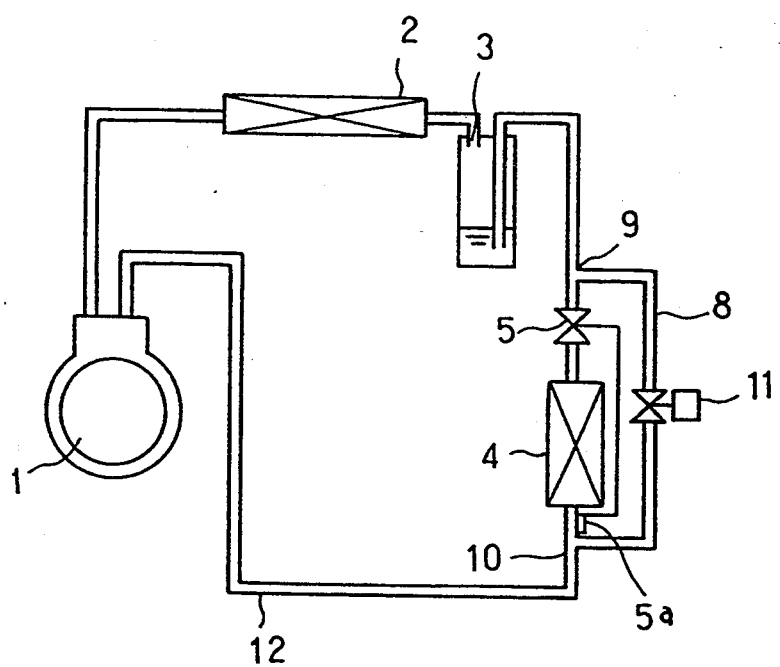
FIG. 9 is a diagram showing another refrigerant cycle of the automotive air conditioner of the present invention.

The result of the experiment shown in FIG. 8 was gained by using the refrigerant cycle shown in FIG. 9. However, the inventors of this invention did an experiment with the refrigerant cycle shown in FIG. 1, i.e., the refrigerant cycle having the rear evaporator 6, and the same effectiveness was confirmed. In the refrigerant cycle shown in FIG. 1, they further confirmed that the oil return time of the lubricant became somewhat longer with the extension of the high pressure pipe A and the low pressure pipe B, but the absolute value of the oil return time was not so different from the result shown in FIG. 8 and sufficient effectiveness was gained to prevent seizure.

The actual movement of the lubricant is explained when the opening and closing condition of bypass passage 8 is controlled.

Figure 10:
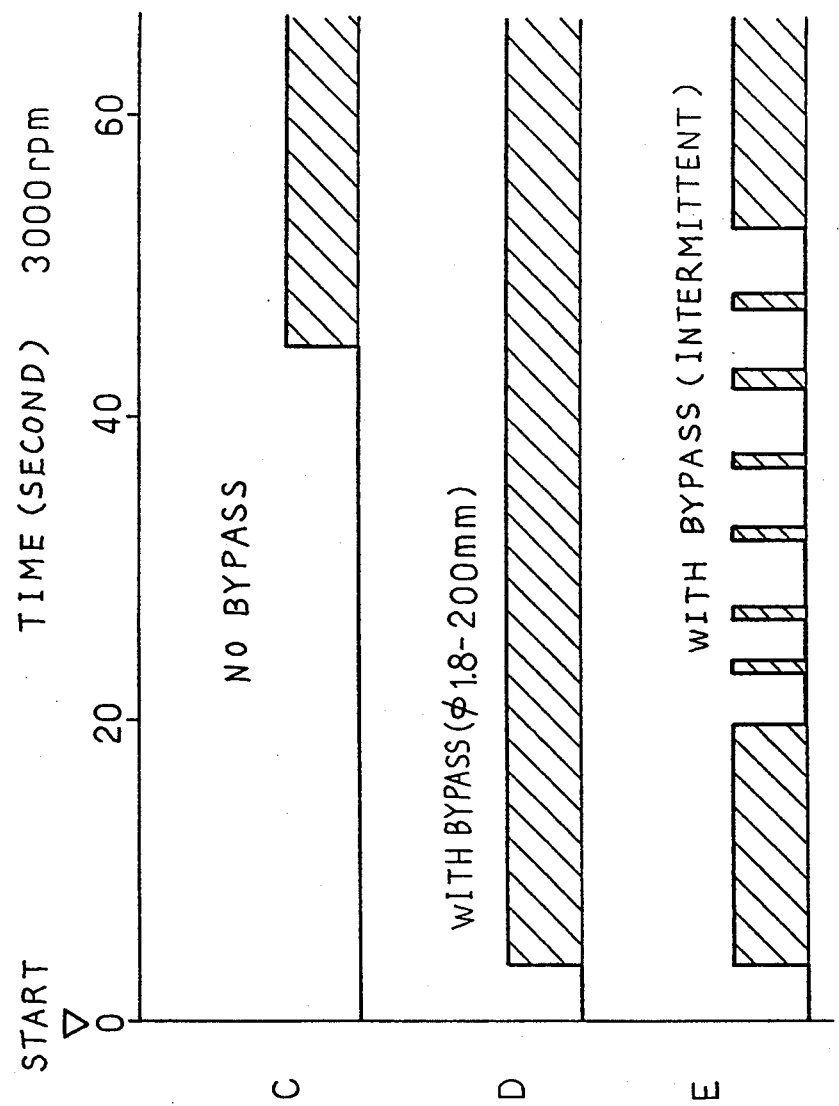
FIG. 10 is a time chart showing lubricant return time.

FIG. 10 shows elapsed time from the starting of the compressor to the return of the lubricant of the compressor. The data for each experiment was obtained under the condition that the revolutions of the compressor 1 was 3000 rpm and the temperature of the outside was 0° C. An upper row C shows an oil return time of the refrigerant cycle having no bypass passage 8 and it took 45 seconds to return the lubricant. A middle row D shows an oil return time of the refrigerant cycle having the bypass passage 8. It was confirmed that it took about 4 seconds to return the lubricant. A lower row E shows a condition of the returning lubricant when the bypass valve 11 was open only for the first 20 seconds. As shown in the lower row E, when the bypass passage 8 is open, the returning lubricant is detected in about 4 seconds.

When the bypass valve 11 is closed after being open for 20 seconds, the lubricant does not return, rather the lubricant remains in the middle of the low pressure pipe B and intermittently returns to the compressor 1 with the refrigerant as shown in row E of FIG. 10. It is thought that this intermittent movement of the returning lubricant mainly relates to an intermittent suction process of the compressor 1. After 52 seconds have passed, the lubricant, passing through the evaporator, returns with the refrigerant.

Thus, in case that the bypass passage 8 is opened for 20 seconds and after that the bypass passage 8 is closed, it is recognized that the lubricant, passing through the evaporator, returns with the normal refrigerant in 32 seconds after the bypass passage 8 is closed. Compared to the upper row C which took 45 seconds, it shortens the oil return time by 13 seconds. Further, by opening the bypass passage 8 for 20 seconds the refrigerant which is in high density returns to the compressor at its early stages so that anti-seizure at the moving parts of the compressor 1 during the period after the bypass valve closes and until the lubricant returns with the normal refrigerant is greatly improved.

Consequently, judging from the experiment of FIG. 10, under the condition that the temperature of the outside air is 0° C. and the speed of the compressor is 4000 rpm, it is recognized that by opening the bypass passage 8 at least for 20 seconds at its early stages anti-seizure is sufficiently obtained.

However, the oil return time at the starting of the compressor sharply changes depending on the revolutions of the compressor or the temperature of the outside air as FIG. 8 shows clearly. Therefore, even during the opening time of the bypass passage 8 at the starting of the compressor, it is desirable to vary the opening time in response to the revolutions of the compressor or the temperature of the outside air.

Figure 11:
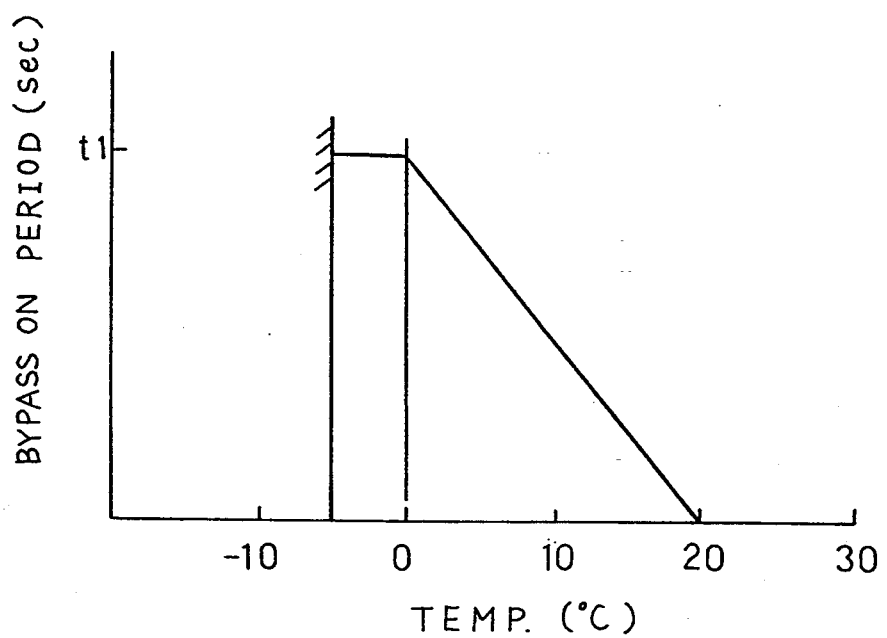
FIG. 11 is a graph showing temperature of the outside air versus open-state time of the bypass valve.

FIG. 11 shows an example that opening time of the bypass passage 8 $t_1$ at the starting of the compressor 1 is varied in response to the temperature of the outside air. The necessity to reduce seizure in the early stage at the starting of the compressor 1 arises when in a variable capacity compressor a discharge volume is low at low temperature, or a volume of the circulating refrigerant is throttled by an evaporated pressure regulator (EPR) disposed downstream of the evaporator. Therefore, it is effective to adjust the open-state time of the bypass passage 8 in response to the temperature of the outside air.

FIG. 11 shows that in case that the lowest temperature that the compressor is required to start is set at −5° C., the opening time of the bypass passage 8 $t_1$ at the starting of the compressor between −5° C. and 0° C. is set at maximum, e.g., 20 seconds and after that the opening time $t_1$ is gradually reduced in response to the rising temperature of the outside air. When the temperature of the outside air rises to 20° C., there is no need to open the bypass passage 8 and even at the starting of the compressor the bypass valve 11 is kept closed.

To open the bypass passage 8 at the start is only effective to prevent seizure of the compressor 1. In other points of the cooling system, it does not contribute at all, and the amount of the refrigerant supplied to the evaporator is reduced and that causes disadvantages. Therefore, when the external temperature is high and initial cooling is required, cooling is performed quickly by keeping the bypass passage 8 closed.

When a long time has passed since the air conditioner stopped, the pressure in the refrigerant cycle becomes almost equal. In this condition the refrigerant pressure in the refrigerant cycle varies in response to the temperature of the outside air.

Figure 20:
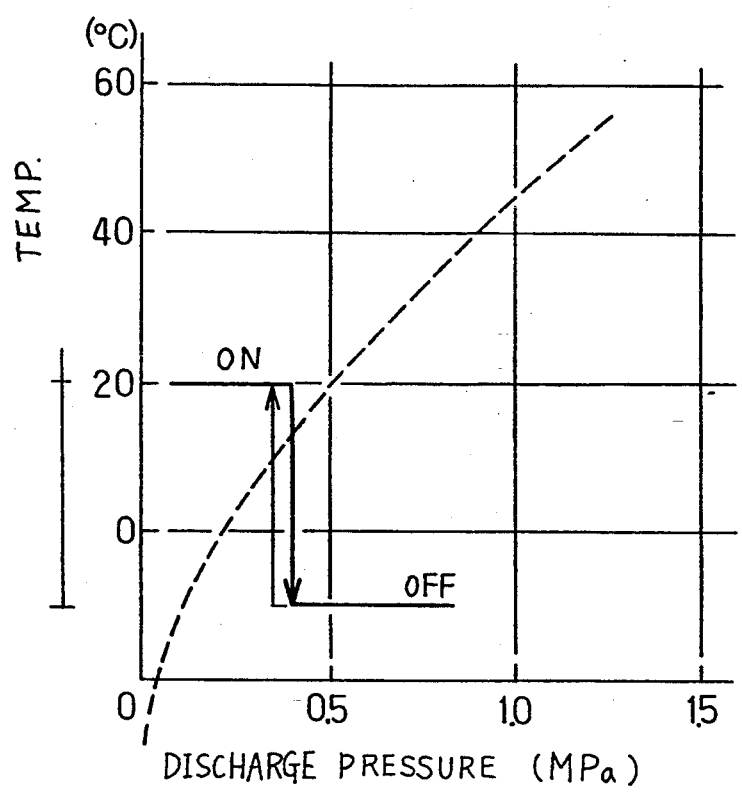
FIG. 20 is a graph showing refrigerant pressure in the refrigerant cycle versus outside air temperature in such state.

FIG. 20 shows the relationship between the refrigerant pressure (MPa) under the equal pressure condition and the saturation temperature (°C.) corresponding to the refrigerant pressure. When a control to open and close the bypass passage 8 is done as a parameter of the temperature of the outside air, the control may be done with the refrigerant pressure without inspecting the temperature of the outside air. It is practically preferred that the refrigerant pressure control the bypass passage 8 as stated as follows.

It was confirmed from the discussion of the experiment by the inventors that a noise caused by the bypass passage arose when the bypass passage 8 was opened, and a refrigerant passing sound and a refrigerant passing vibration which were caused when the refrigerant passed through the bypass valve 11 were transmitted to the evaporator 6 through a refrigerant pipe so that a resonance sound arose, which was transmitted to the compartment through a cooling unit and a body of a car as the noise. It is recognized that there is a correlation between the noise level of the noise and the refrigerant pressure of high pressure side of the compressor 1 as shown in FIG. 21.

Figure 21:
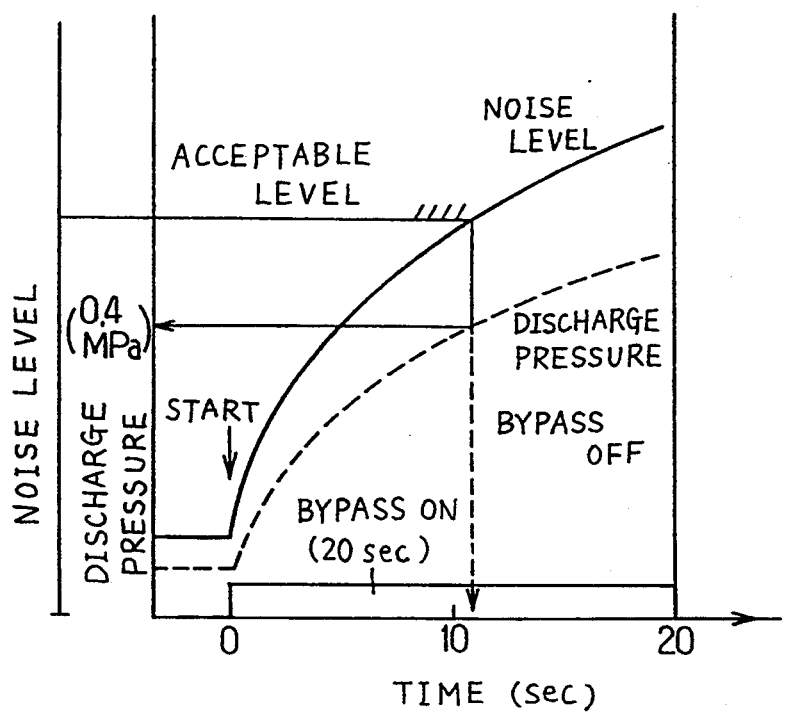
FIG. 21 is a graph showing high pressure at the open-state of the bypass passage versus noise level.

In FIG. 21, the abscissa axis shows elapsed time after the bypass passage 8 is opened ordinate axis shows pressure of the discharging side of the compressor and the noise level transmitted into the compartment. As FIG. 21 shows clearly, when the compressor 1 starts with the bypass passage 8 open, the refrigerant pressure of discharging side rises corresponding to elapsed time after the start of the compressor and at the same time the noise level caused from the bypass passage 8 also rises. Therefore, when the bypass valve 11 is controlled to open and close by considering the pressure of the discharge side of the compressor 1 as a parameter, it is achieved simply to control the noise level within an allowable value. According to the result of FIG. 21, it is recognized that if the pressure is under 0.4 MPa, the noise level is less than an acceptable level so that an air conditioner is practically silent.

Figure 12:
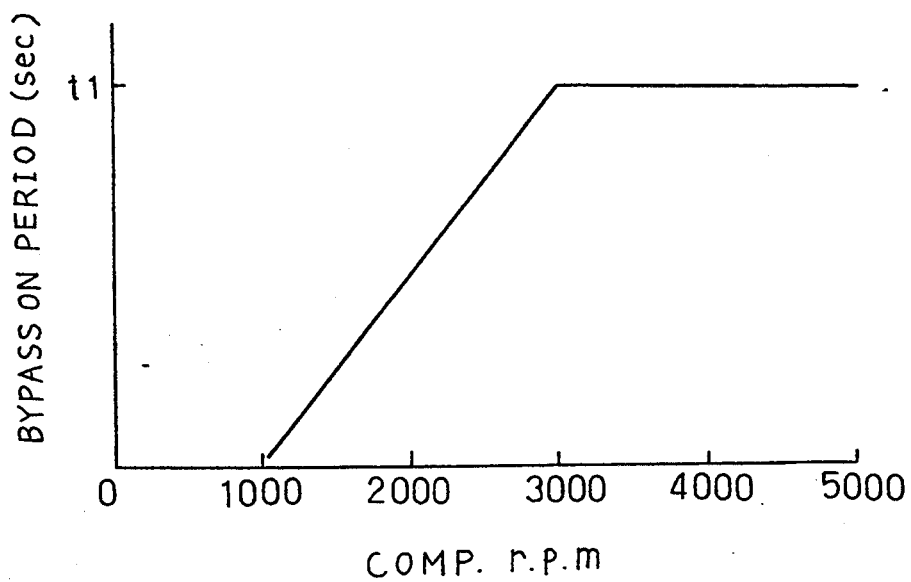
FIG. 12 is a graph showing revolutions of the compressor versus open-state time of the bypass valve.

FIG. 12 shows the relationship between the number of revolutions of the compressor 1 and the opening time of the bypass passage 8 $t_1$. As FIG. 8 shows clearly, the area X which causes seizure of the compressor 1 is biased towards the high speed side of the compressor 1.

In other words, when the number of revolutions of the compressor 1 is low, seizure, etc. usually does not occur even if the lubricant returns late. This means that when the revolutions of the compressor 1 is low, the discharged lubricant returns late and at the same time the existence of lubricant adhered the inside of the compressor 1 is recognized. Thus, if there is an adhesive lubricant inside, seizure is unlikely to occur even if the lubricant returns late. Further when the number of revolutions of the compressor is low, the load impressed to each moving part of the compressor 1 is likewise reduced so that the compressor 1 operates smoothly even if the lubricant does not return for a long time. Hence, as shown in FIG. 12, if the number of revolutions is under 1000 rpm, the bypass passage 8 does not open. When the number of revolutions of the compressor is over 3000 rpm, the bypass passage 8 maintains an open-state for a predetermined time $t_1$ e.g., 20 seconds, and when the number of revolutions thereof is between 1000 rpm and 3000 rpm, the predetermined time $t_1$ increases responding to the increase of the number of revolutions of the compressor.

According to the embodiment, the frequency of opening the bypass passage 8 is minimized so that the use of the bypass passage 8 other than for the purpose of preventing seizure of the compressor is effectively restricted.

The control method shown in FIG. 12 is combined and used with the control method shown in FIG. 11 in the control circuit shown in FIG. 6. Specifically, the opening time of the bypass passage 8 at the start is controlled mainly in response to the temperature of the outside air, and the number of revolutions of the compressor 1 is used for its compensating coefficient.

It is experimentally confirmed that seizure of the compressor occurs easily at the start because it tends to take a longer time to return the lubricant when the discharging capacity of the compressor is smaller, such as at the start. Therefore, this embodiment also employs the discharging capacity at the start of the compressor as a compensating coefficient for compensating for the open-time of the bypass passage 8. In FIG. 6 the control means sets the open-time of the bypass passage 8 at the start of the compressor mainly based on the outside air temperature signal 204, while the compressor revolution signal 205 and the compressor capacity signal 206 are used for compensation.

The preferred embodiments are explained above, however, some modified embodiments are also included within the scope of the present invention. Modified embodiments are explained as follows.

Figure 13:
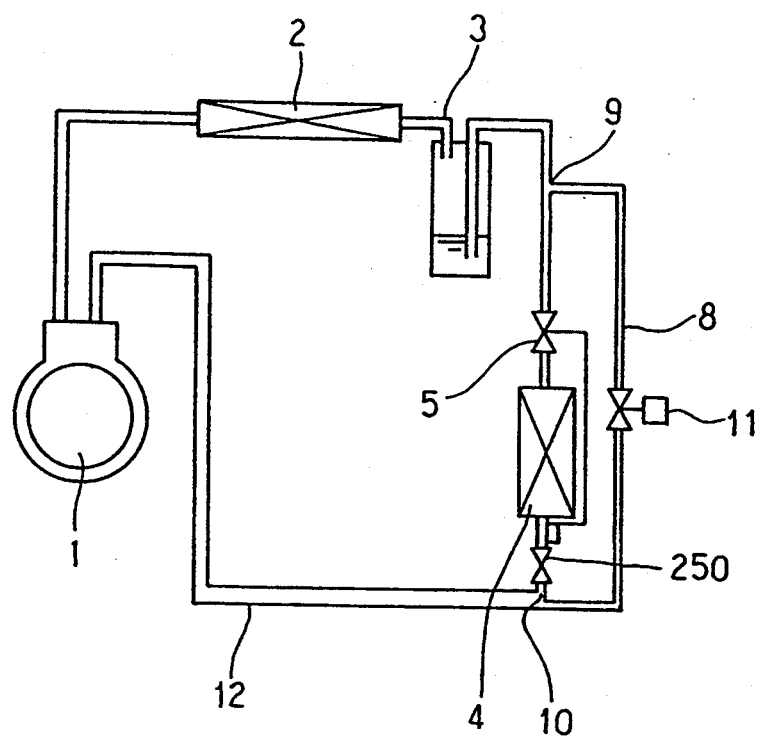
FIG. 13 is a diagram showing another refrigerant cycle of the automotive air conditioner of the present invention.

The refrigerant cycles in FIGS. 1 and 9 do not employ an evaporated pressure regulator (EPR) downstream of the evaporators 4 and 6, but it is clear that this invention can be applicable to the refrigerant cycle having EPR. Since EPR tends to narrow the refrigerant passage at low temperatures, in a refrigerant cycle having an EPR 250 as shown in FIG. 13, the bypass passage 8 of the present invention works more effectively. Therefore in the refrigerant cycle having an EPR, an outlet side end portion 10 of the bypass passage 8 is connected to the downstream end of the EPR 250.

The bypass passage 8 is meaningful if it bypasses at least one of the expansion means, evaporator or EPR, hence an inlet side end portion 9 of the bypass passage 8 may be disposed between the compressor 1 and the condenser 2 or between the condenser 2 and the receiver 3.

If the bypass passage 8 is arranged to bypass only one of the expansion means, the evaporator 4 or the EPR 250, the oil return time becomes longer compared to the case that the bypass passage 8 bypasses all devices 4, 5 and 250. However, the oil return time is shortened enough to prevent seizure of the compressor 1 compared to the case where the bypass passage 8 does not bypass at all.

In the above embodiment, the opening time of bypass passage 8 at the start of the compressor 1 is variable based on the temperature of the outside air, the revolutions of the compressor 1 and the capacity of the compressor 1. However, the open-time may be fixed for a set time, such as about 20 seconds.

As the compensating items for the opening time of the bypass passage 8 at the start of the compressor, throttle volume of the expansion means, the revolutions of the engine or throttle volume of EPR, etc. may be used.

Figure 14:
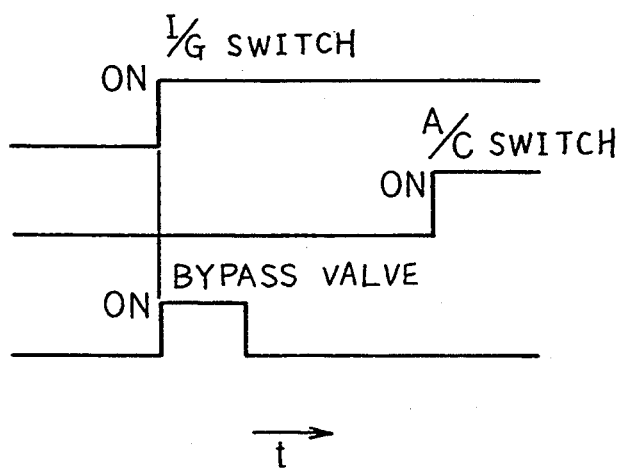
FIG. 14 is a time chart explaining a control condition of the control means.

In FIGS. 6 and 7, the bypass passage 8 opens only when the switch of an air conditioner is first turned on after an engine is turned on. However, as shown in FIG. 14, when the ignition key switch signal 201 is input, the bypass valve 11 may open for a determined time without reference to the air conditioning switch signal. An electric magnetic clutch 203 operates at the same time as the bypass valve 11 opens and the compressor 1 runs for a determined time.

In the embodiment shown in FIG. 14, before the air conditioning switch is turned on, the bypass valve 11 opens the bypass passage 8, and the compressor is ready to run because the lubrication inside the compressor has been completed. Hence, when a passenger turns on the air conditioning switch, the lubrication is already completed so that seizure-lock of the compressor is prevented. In the above embodiments the bypass passage 8 opens only at the start to improve the anti-seizure of the compressor 1, however, the bypass passage 8 may open when lubrication of the compressor 1 is required in addition to the structure that the bypass passage 8 opens at the start of the compressor, or apart from that structure. When the compressor 1 regularly operates at its minimum capacity, the volume of the circulated lubricant is reduced pursuant to the reduction of discharged refrigerant so that the volume of the lubricant inside the compressor 1 is likewise reduced. In this case, the moving parts may not seize and break. However, it is thought that the lives of the moving parts are shortened. Particularly, the compressor 1 causes a shortage of refrigerant after long-term use and the circulated lubricant is further reduced. Hence, the reduction of lubricant is not negligible with respect to the durability of moving parts. Hence, when the capacity of the compressor 1 is basic capacity, the bypass valve is opened intermittently by a timer to ensure that the lubricant returns to the compressor 1. FIGS. 15(a) and 15(b) show an embodiment where an interval of the timer for securing return lubricant is varied responding to the temperature of the outside air. Specifically, when the temperature of the outside air becomes lower, the frequency of opening the bypass valve 11 becomes larger, and when the temperature becomes higher, the frequency thereof becomes lower. As shown in FIG. 15(a), an interval $t_1$ at a low temperature is shorter than an interval $t_2$ at a mid temperature. In FIG. 15(b), the compressor is set not to operate under $-5°$ C., hence, the lowest temperature that the compressor runs is $-5°$ C. and the interval to open the bypass valve 11 is about 20 seconds. In contrast to the low temperature operation when the temperature of the outside air rises above 10° C., the bypass valve 11 does not open. When the temperature of the outside air rises to 10° C., the longest interval to open the bypass valve 11, e.g., 100 seconds, is applied. When the temperature of the outside air is between −5° C. and 10° C., the interval for opening the bypass valve 11 becomes larger in response to a rise of the temperature of the outside air.

The inventors experimentally ascertained the influence of opening the bypass passage 8 on an air conditioner during regular operation. When the number of revolutions of the compressor 1 was 700 rpm and the temperature of the outside air was 0° C., the temperature variation of discharged air from the evaporators 4 and 6 was measured. The temperature of the discharged air at the front evaporator 4 was −0.4° C. with the bypass passage 8 closed. However, when the bypass passage 8 was opened, the temperature of the discharged air rose to 0.7° C. On the other hand, the temperature of the discharged air at the rear evaporator 6 was −0.1° C. with the bypass passage 8 closed and the temperature rose to 1.1° C. when the bypass passage opened.

The same experiment was done with the number of revolutions of the compressor being 2000 rpm and the temperature of the outside air being 0° C. In this case the temperature of discharged air from the front evaporator 4 rose from −0.8° C. to 0.5° C. when the bypass passage 8 opened. The temperature at the rear evaporator 6 rose from −0.5° C. to 1.1° C. when the bypass passage 8 opened.

Further, the same experiment was done when the temperature of the outside air was 25° C. and the number of revolutions of the compressor 1 was 700 rpm. In this case the temperature of discharged air from the front evaporator 4 rose from 11.4° C. to 15.0° C. At the rear evaporator 6, the temperature rose from 15.0° C. to 18.3° C.

When the temperature of the outside air was 25° C. and the number of revolutions of the compressor 1 was 2000 rpm, the same experiment was done. In this case the temperature of the discharged air from the front evaporator 4 rose from 9.2° C. to 11.1° C. At the rear evaporator 6, the temperature rose from 14.0° C. to 17.4° C. The temperature of discharged air from the evaporator was determined by measuring the temperature of the air 20 seconds after the bypass passage 8 was opened. Thus, when the compressor 1 runs regularly, if the bypass passage 8 is open, it is confirmed that the cooling ability is reduced and the temperature of the discharged air rises. However, if the open-state of the bypass passage 8 is finished within 20 seconds, a rise in temperature of the discharged air is within 2° C. and a passenger does not feel uncomfortable due to the small variation of the temperature.

In the case where the bypass passage 8 is open when the compressor runs regularly, noise originated from the bypass passage 8 becomes a problem, similar to the case of starting.

According to the study by the inventors, it was confirmed that this noise became louder as time elapsed after the bypass passage 8 was opened. Further, the inventors determined that the noise level related to high pressure in the refrigerant cycle. Further, it was confirmed that when the high pressure was more than 0.78 MPa, noise became a problem, but the noise did not become a problem when the high pressure is 0.54 MPa and below. Consequently, when the bypass passage 8 is opened during regular operation, it is desirable to close the bypass valve 11 when the high pressure rises to 0.78 MPa or more by detecting the high pressure of the refrigerant cycle.

Figure 15:
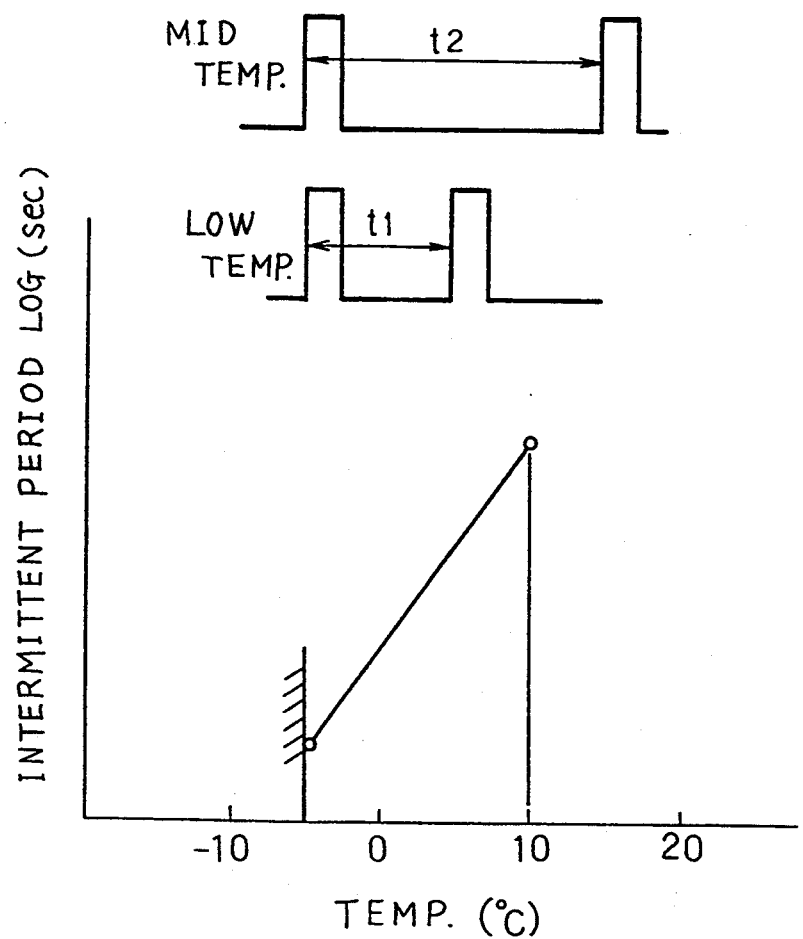
FIG. 15 is a time chart showing intermittent period of a timer at the mid- and low temperature and a graph showing the open-state interval of the bypass valve versus temperature of the outside air.

In FIG. 15, the bypass valve 11 intermittently opens and closes only when the compressor 1 runs with minimum capacity. However, opening and closing the bypass valve 11 may start being controlled when the capacity of the compressor 1 is less than a determined capacity. In this case it is desirable that an interval is controlled responding to the capacity of the compressor, i.e., the interval is set to be short when the compressor 1 runs with small capacity.

According to the study conducted by the inventors, at the regular operation the lubricant is strongly required to return to the compressor 1 when the high pressure of the air conditioner becomes 0.35 MPa and below. Therefore, it is desirable that the bypass passage 8 opens when the high pressure becomes 0.35 MPa and below and the bypass passage 8 closes when the high pressure becomes 0.4 MPa or more. Similarly, by detecting the number of revolutions of the compressor 1, it is desirable to open the bypass passage 8 when the revolutions thereof is 1300 rpm and below, and to close the bypass passage 8 when the number of revolutions thereof is 1500 rpm or more. Further, in order to reduce the frequency to open the bypass passage 8 during regular operation, the bypass passage 8 does not open until the above condition (the high pressure and the number of revolutions of the compressor) lasts for 15 minutes. Furthermore, it is desirable that the time to open the bypass passage 8 is for 20 seconds or less.

In the above embodiments, in order to let the refrigerant bypass the expansion means or EPR, the bypass valve 11 is disposed as a different valve from the expansion valve 7 or EPR 250 in the bypass passage 8. However, in case that an electric expansion valve is utilized as an expansion means or in case that the opening angle of the EPR is varied by an external signal, a passage in the expansion valve may be utilized as a bypass passage by the control means opening the expansion valve, etc. without use of a special bypass passage.

Figure 16:
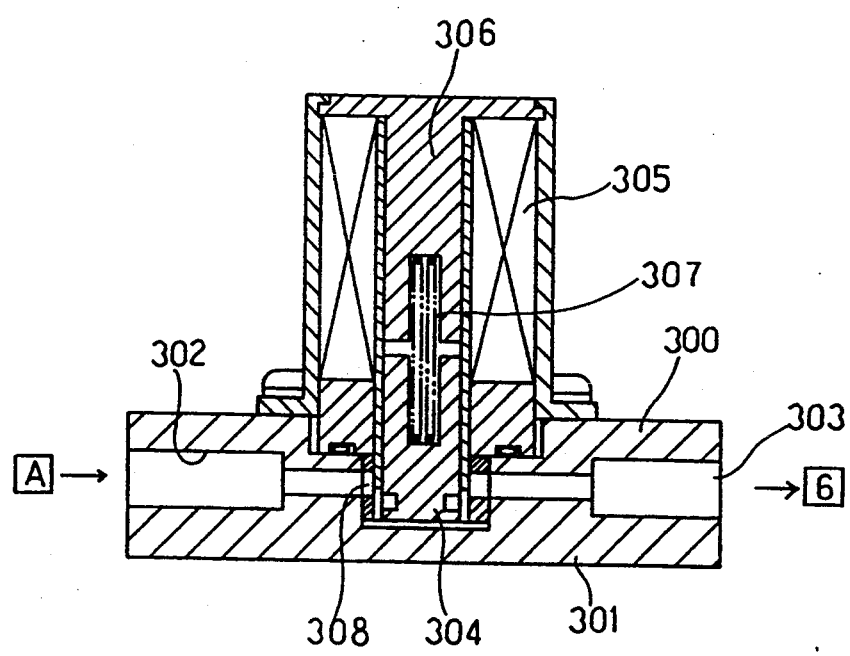
FIG. 16 is a cross-sectional view of an electric expansion valve utilized for the modified embodiment of the present invention.
Figure 17A:
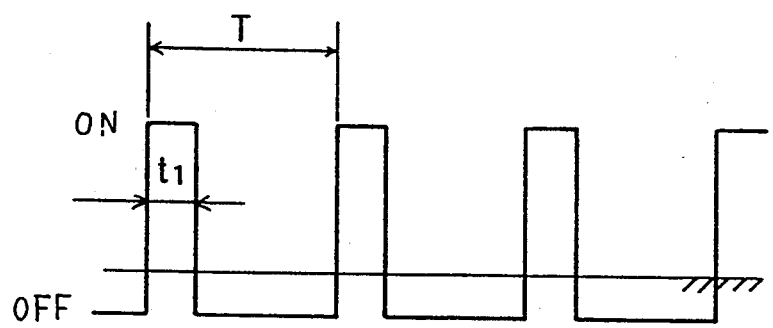
FIGS. 17A and 17B are diagrams explaining an impressed voltage for the electric expansion valve shown in FIG. 16.

FIG. 16 shows an electric expansion valve 300 as an example of an expansion means. The electric expansion valve 300 in FIG. 16 is disposed at the position of the expansion means 7 and 5 in the refrigerant cycle of FIGS. 7 or 9. A refrigerant inlet aperture 302 formed in a housing 301 of the electric expansion valve 300 connects to a high pressure refrigerant pipe A and a refrigerant outlet passage 303 connects to the evaporator 6. The numeral 304 is a valve body, which is able to be displaced up and down to receive an exciting force from an electric magnetic coil 305. When a magnetic circuit is formed between the valve body 304 and a fixed core 306 by applying an electric signal to the electric magnetic coil 305, magnetic force occurs between them and draws the valve body 304 upwards. When the electric signal is applied to the electric magnetic coil 305 is stopped, the valve body 304 displaces downward via a force of the spring 307. Since the valve body 304 displaces downward, the refrigerant passage 308 is throttled by the valve body 304 so that the volume of reduced pressure of the refrigerant gets large when passing through the valve body 304. Normally throttled amount of this electric expansion valve 300 is adjusted by controlling the impressed voltage of the electric magnetic coil 305 with duty proportioned control as shown in FIG. 17(a). Since the interval is generally as fast as the valve body 304 it can switch ON-and-OFF without problems, the duty proportion control is set around 10 Hz.

Figure 17B:
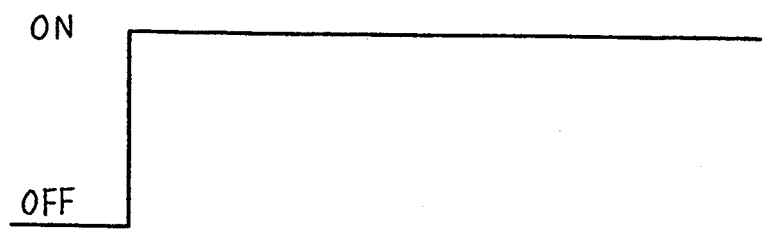

In contrast, when the refrigerant passage 308 of this electric expansion valve 300 is utilized as a bypass passage, an impressed voltage to electric magnetic coil 305 is continuously loaded for a determined time, e.g., 20 seconds as shown in FIG. 17(b). Consequently, when enough returning oil is required, like at the start-up of the compressor 1, continuous application of electricity by a timer, rather than duty preparation control by an outside signal, and expansion valve passage is forcefully released. It is desirable that the releasing operation of valve body 304 of this expansion valve 300 is performed by continuous application of electricity as shown in FIG. 17(b), however, to set the ON time of duty proportion control longer than usual is also able to increase the amount of necessary refrigerant and oil circulating.

In FIG. 16, the electric magnetic coil 305 is used as electric expansion valve 300, however, something to control displacement from the outside with pulse motor, servo valve, etc., may achieve the same function by releasing the valve body 304 forcefully.

Figure 18:
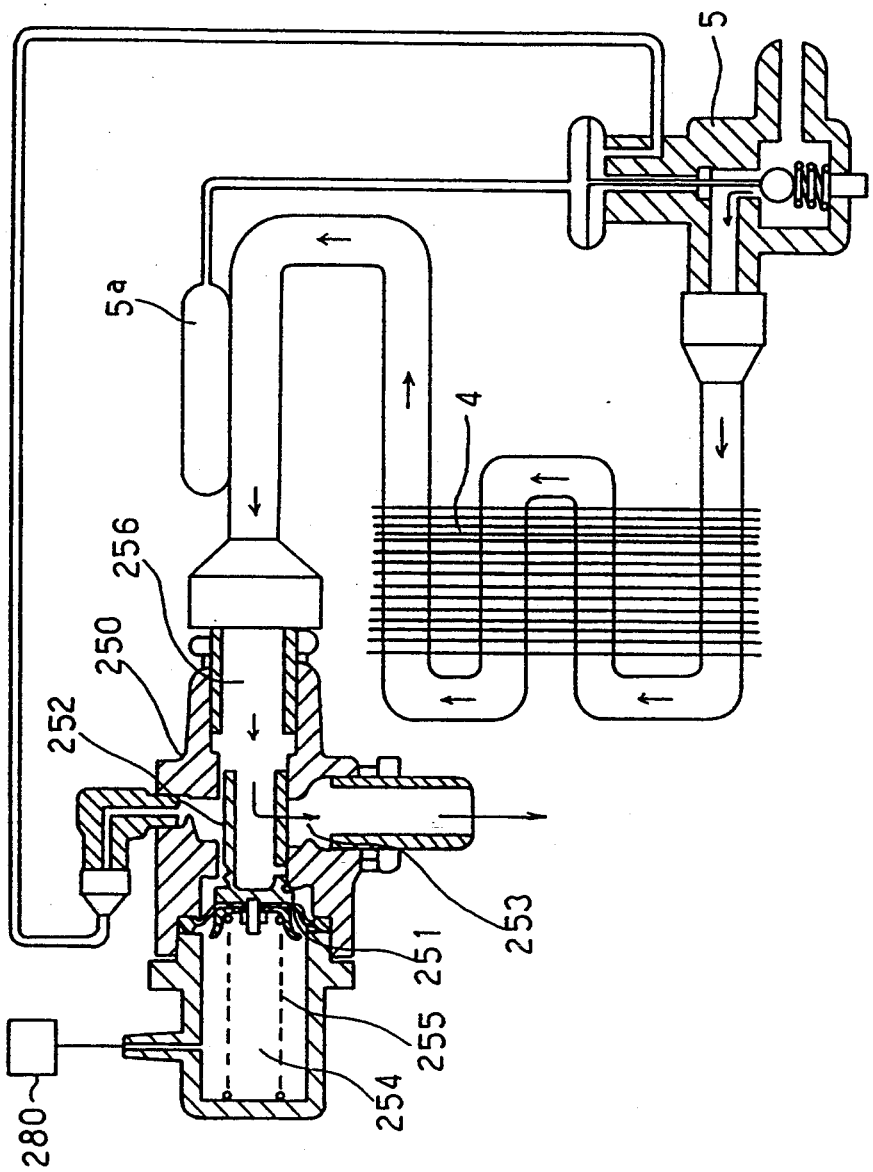
FIG. 18 is a cross-sectional view of an EPR (Evaporated Pressure Regulator) utilized for the modified embodiment of the present invention.

FIG. 18 shows an example where an EPR 250 is used. The EPR 250 is disposed in the refrigerant cycle shown in FIG. 13. EPR 250 displaces the body 252 corresponding to a different pressure between the front and back of a diaphragm 251 so that the refrigerant passage 253 is throttled. Consequently the refrigerant pressure in the evaporator 4 is adjusted. Specifically, the valve body 252 is displaced right and left in the drawing by a balance between, the refrigerant pressure in the pressure chamber 254 and the force of the spring 255, and the refrigerant pressure in the refrigerant passage 256 connected to the outlet of the evaporator 4, so that the open area of the passage 253 is adjusted. For example, when a load on the air conditioner becomes low and an evaporating pressure of the refrigerant in the evaporator 4 becomes low, a set pressure of the spring 255 becomes higher than the evaporating pressure of the refrigerant, so that the valve body 252 closes the passage 253. This operation raises the pressure of the refrigerant in the refrigerant passage 256 and the refrigerant pressure of the outlet of the evaporator 4 is prevented from becoming lower than a determined value. Therefore, in the case where EPR 250 is utilized when the temperature is low and the air conditioning load is low, the valve body 252 closes the passage 253 so that the returning amount of the lubricant remarkably decreases. In particular, velocity of the lubricant and the refrigerant increase at low temperatures, and it becomes harder to return the lubricant to the compressor.

Further, in FIG. 18, a pressure switch valve 280 is used to vary the pressure in a pressure chamber 254 forcefully and a diaphragm 25, is displaced toward the pressure chamber 254 without depending upon the pressure of the refrigerant in the refrigerant pipe 256 at the start of the compressor 1, so that the valve body 252 widely opens the passage 253. In other words, the passage 253 functions as a bypass passage.

Figure 19:
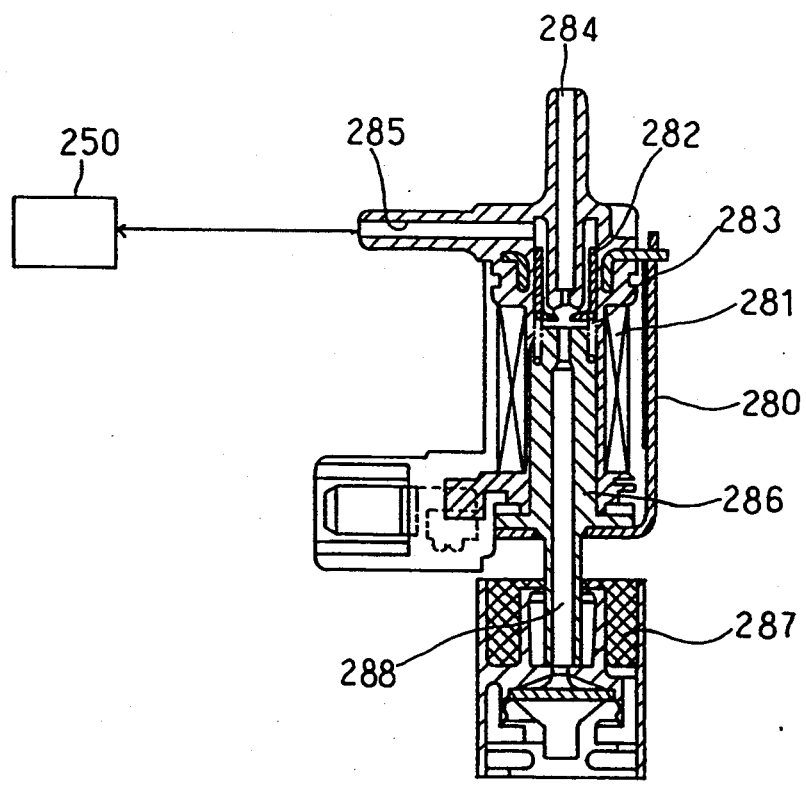
FIG. 19 is a cross sectional view of a switching valve for switching signal voltage for the EPR shown in FIG. 18.

The pressure switch valve 280 switches the pressure supplied to the pressure chamber 254 as shown in FIG. 19 between the atmospheric and the negative pressure in an intake manifold of an automotive engine. Normally, a voltage is not impressed to an electric magnetic coil 281, and the valve body 282 is displaced upward in the drawing by the force of the spring 283. As a result, air is sucked from an atmospheric port 288 and is supplied to the EPR 250 side through an outlet port 285. When the bypass passage is required to open like at the start up of the compressor 1, a voltage is impressed to the electric magnetic coil 281 and a magnetic force is generated between the valve body 282 and a fixed core 286 so that the valve body 282 is displaced downwards in the drawing against to the force of the spring 283. Consequently, the air sucked from the atmospheric port 288 through a filter 287 is reduced by the valve body 282, and negative pressure in the intake manifold is supplied through a negative port 284. That is, negative pressure is supplied from the outlet port 285 to EPR 250 and reduces pressure in the pressure chamber 254. Hence, the diaphragm 251 in EPR 250 is displaced against the force of the spring 255 and the passage 253 is wide open.

In FIG. 18, the pressure in the pressure chamber 254 is switched by the switching valve 280 so that the bypass passage is formed in EPR 250. However, by disposing an electric magnetic valve, a stepper motor, etc., in EPR 250, the passage 253 may be opened.

As stated above, an automotive air conditioner of the present invention is configured so that a bypass passage bypasses an expansion means. An evaporator, in which lubricant discharged with refrigerant may stagnate, is disposed in the air conditioner. The bypass passage is controlled to open and close. The lubrication of the compressor 1 is remarkably improved by opening this bypass passage when the lubricant for the compressor is low.

Particularly, when the compressor starts up at a low temperature, high number of revolutions and small capacity, etc., which can easily cause shortages of the lubricant for the compressor, or when the compressor is continuously operated as a small capacity, etc., it was experimentally confirmed that by opening this bypass passage, the durability of the compressor was improved greatly.

Specifically, when the lubricant returns to the compressor late, i.e., the first start after a long stop, or long-term, small capacity drive of the compressor with a low outside air temperature, the lubricant is returned satisfactorily to the compressor by opening the bypass passage.

In the automotive air conditioner of the present invention, the lubrication of the compressor is secured by opening the bypass passage, and at the same time, noise pursuant to opening the bypass passage is well restrained. The bypass passage is not open long enough that noise becomes very loud, nor does the high pressure surpass the predetermined value. Consequently, the automotive air conditioner of the present invention completes the lubrication and the silence of driving.

What is claimed is:
1. An automotive air conditioner comprising:
a compressor for compressing and discharging a refrigerant;
a condenser for liquifying the refrigerant discharged from said compressor;
an expansion means for decompressing and expanding the liquified refrigerant;
an evaporator for evaporating the refrigerant decompressed by said expansion means;
a bypass passage means of which one end is connected to the upstream of said expansion means and the other end is connected to the downstream of said evaporator and for letting the refrigerant bypass said expansion means and said evaporator;

a bypass valve for opening and closing said bypass passage means; and a control means for controlling opening and shutting of said bypass valve;

wherein said compressor includes variable capacity control means for varying a discharge capacity;

wherein said control means determines the start of said compressor and an exterior temperature, and opens said bypass valve for a predetermined opening time and allows the refrigerant to flow into said bypass passage when the exterior temperature is a predetermined temperature or less in a low temperature range and when said compressor starts so that lubricant discharged from the compressor is returned with the refrigerant to said compressor.

2. An automotive air conditioner as in claim 1 wherein said control means further determines the number of revolutions of said compressor, and opens said bypass valve and allows the refrigerant to flow into said bypass passage when a condition is satisfied that the number of revolutions of said compressor is greater than or equal to a predetermined number of revolutions in a high range of revolutions.

3. An automotive air conditioner as in claim 2 wherein said control means inputs the number of revolutions of said compressor and controls the opening time of said bypass valve and allows the refrigerant to flow into said bypass passage, said opening time being longer in case the number of revolutions becomes higher and shorter in case the number of revolutions becomes lower.

4. An automotive air conditioner as in claim 1 wherein said control means determines the temperature of the outside air and controls the opening time of said bypass valve and allows the refrigerant to flow into said bypass passage, said opening time being longer in case that the temperature of the outside air gets lower and shorter in case that the temperature of the outside air gets higher when the compressor starts.

5. An automotive air conditioner as in claim 1, wherein said control means further determines the pressure of the refrigerant in said air conditioner, and opens the bypass valve and allows the refrigerant to flow into said bypass passage when a condition is satisfied that the refrigerant pressure is lower than a predetermined value.

6. An automotive air conditioner as in claim 5 wherein said control means determines a pressure from the high pressure side at a discharge side of said compressor and at an upstream side of said expansion means.

7. An automotive air conditioner as in claim 6 wherein said control means opens said bypass valve and allows the refrigerant to flow into said bypass passage when the pressure of the high pressure side of the air conditioner is 0.35 MPa or less, and said control means closes said bypass valve when the pressure of the high pressure side of the air conditioner is 0.4 MPa or more.

8. An automotive air conditioner as in claim 1, wherein said control means determines a drive start signal of a driving source of said compressor and a power transmission start signal from the driving source to said compressor, said control means opens said bypass valve and allows the refrigerant to flow into said bypass passage only when said power transmission signal is first transmitted after said drive start signal is input.

9. An automotive air conditioner comprising:

a compressor for compressing and discharging a refrigerant;

a condenser for condensing the refrigerant discharged from said compressor;

a front evaporator for cooling the air blown off in a front portion of a passenger compartment of a vehicle;

a front expansion means for decompressing and expanding the refrigerant discharged into said front evaporator;

a rear evaporator for cooling the air blown off in a rear portion of said compartment;

a rear expansion means for decompressing and expanding the refrigerant discharged into said rear evaporator;

a bypass passage means for forming a bypass passage bypassing said rear expansion means and said rear evaporator;

a bypass valve for controlling a flow of the refrigerant discharged into said bypass passage means; and a control means for controlling opening and shutting of said bypass valve;

wherein said compressor includes variable capacity control means for varying a discharge capacity;

wherein said control means determines the start of said compressor and an exterior temperature, and opens said bypass valve for a predetermined opening time and allows the refrigerant to flow into said bypass passage when the exterior temperature is a predetermined temperature or less in a low temperature range and when said compressor starts so that lubricant discharged from the compressor is returned with the refrigerant to said compressor.

10. An automotive air conditioner comprising:

a compressor for compressing and discharging a refrigerant;

a condenser for liquifying the refrigerant discharged from said compressor;

an expansion means for decompressing and expanding the liquified refrigerant;

an evaporator for evaporating the refrigerant decompressed by said expansion means;

a bypass passage means of which one end is connected to the upstream of said expansion means and the other end is connected to the downstream of said evaporator and for letting the refrigerant bypass said expansion means and said evaporator;

a bypass valve for opening and closing said bypass passage means; and a control means for controlling opening and shutting of said bypass valve;

wherein said compressor includes variable capacity control means for varying a discharge capacity;

wherein said control means inputs the pressure of a high pressure side at a discharge side of said compressor and at an upstream side of said expansion means and the number of revolutions of said compressor, said control means opens said bypass valve for a predetermined time and allows the refrigerant to flow into said bypass passage when the pressure of the high pressure side is under a predetermined pressure, the number of revolutions of the compressor is under a predetermined revolution, and a predetermined time passes so that lubricant discharged from the compressor is returned with the refrigerant to said compressor.

11. An automotive air conditioner as in claim 10 wherein said control means opens said bypass valve and allows the refrigerant to flow into said bypass passage when a condition is satisfied that the pressure of the high pressure side is kept at 0.35 MPa or less and the number of revolutions of said compressor is no higher than 1300 rpm for 15 minutes.

12. An automotive air condition as in claim 10 wherein said control means inputs the high pressure at the discharge side of said compressor and at the upstream side of said expansion means and the number of revolutions of said compressor even when the bypass valve is ready to open and the refrigerant is ready to enter said bypass passage, when said high pressure is over a predetermined pressure and the number of revolutions of said compressor is over a predetermined number, said control means closes said bypass valve.

13. An automotive air conditioner as in claim 12 wherein said control means closes said bypass valve when said high pressure is 0.7 MPa or more and the number of revolutions of said compressor is at least 1500 rpm.

14. An automotive air conditioner comprising:
a compressor for compressing and discharging a refrigerant;
a condenser for liquifying the refrigerant discharged from said compressor;
an expansion means for decompressing and expanding the liquified refrigerant;
an evaporator for evaporating the refrigerant decompressed by said expansion means;
a bypass passage means of which one end is connected to the upstream of said expansion means and the other end is connected to the downstream of said evaporator and for letting the refrigerant bypass said expansion means and said evaporator;
a bypass valve for opening and closing said bypass passage means; and
a control means for controlling opening and shutting of said bypass valve;
wherein said compressor includes variable capacity control means for varying a discharge capacity;
wherein said control means determines the start of said compressor and opens said bypass valve for a predetermined opening time and allows the refrigerant to flow into said bypass passage when said compressor starts so that lubricant discharged from the compressor is returned with the refrigerant to said compressor.

15. An automotive air conditioner as in claim 14 wherein said control means further determines an exterior temperature and opens said bypass valve and allows the refrigerant to flow into said bypass passage when a condition is satisfied that the exterior temperature is no more than a predetermined temperature in a low temperature range.

16. An automotive air conditioner as in claim 15 wherein said control means determines the temperature of the outside air and controls the opening time of said bypass valve and allows the refrigerant to flow into said bypass passage, said opening time being longer in case that the temperature of the outside air gets lower and shorter in case that the temperature of the outside air gets higher when the compressor starts.

17. An automotive air conditioner as in claim 14 wherein said control means further determines the number of revolutions of said compressor, and opens said bypass valve and allows the refrigerant to flow into said bypass passage when a further condition is satisfied that the number of revolutions of said compressor is greater than or equal to a predetermined number of revolutions in a high range of revolutions.

18. An automotive air conditioner as in claim 17 wherein said control means inputs the number of revolutions of said compressor and controls the opening time of said bypass valve and allows the refrigerant to flow into said bypass passage, said opening time being longer in case the number of revolutions becomes higher and shorter in case the number of revolutions becomes lower.

19. An automotive air conditioner as in claim 14, wherein said control means further determines the pressure of the refrigerant in said air conditioner, and opens the bypass valve and allows the refrigerant to flow into said bypass passage when a further condition is satisfied that the refrigerant pressure is lower than a predetermined value.

20. An automotive air conditioner as in claim 19 wherein said control means further determines a pressure from the high pressure side at a discharge side of said compressor and at an upstream side of said expansion means.

21. An automotive air conditioner as in claim 20 wherein said control means opens said bypass valve and allows the refrigerant to flow into said bypass passage when the pressure of the high pressure side of the air conditioner is 0.35 MPa or less, and said control means closes said bypass valve when the pressure of the high pressure side of the air conditioner is 0.4 MPa or more.

22. An automotive air conditioner as in claim 14, wherein said control means determines a drive start signal of a driving source of said compressor and a power transmission start signal from the driving source to said compressor, said control means opens said bypass valve and allows the refrigerant to flow into said bypass passage only when said power transmission signal is first transmitted after said drive start signal is input.

23. An automotive air conditioner comprising:
a compressor for compressing and discharging a refrigerant;
a condenser for condensing the refrigerant discharged from said compressor;
a front evaporator for cooling the air blown off in a front portion of a passenger compartment of a vehicle;
a front expansion means for decompressing and expanding the refrigerant discharged into said front evaporator;
a rear evaporator for cooling the air blown off in a rear portion of said compartment;
a rear expansion means for decompressing and expanding the refrigerant discharged into said rear evaporator;
a bypass passage means for forming a bypass passage bypassing said rear expansion means and said rear evaporator;
a bypass valve for controlling a flow of the refrigerant discharged into said bypass passage means; and
a control means for controlling opening and shutting of said bypass valve;
wherein said compressor includes variable capacity control means for varying a discharge capacity;
wherein said control means determines the pressure of a high pressure side at a discharge side of said compressor and at an upstream side of said expansion means and the number of revolutions of said compressor, said control means opens said bypass valve for a predetermined opening time and allows the refrigerant to flow into said bypass passage when the pressure of the high pressure side is under a predetermined pressure, the number of revolutions of the compressor is under a predetermined number, and a predetermined time passes so that lubricant discharged from the compressor is returned with the refrigerant to said compressor.

* * * * *